(12) United States Patent
Gonzalez

(10) Patent No.: US 11,535,014 B2
(45) Date of Patent: Dec. 27, 2022

(54) COMBINATION FOOD WRAPPER AND NAPKIN

(71) Applicant: Julio Cesar Gonzalez, Lubbock, TX (US)

(72) Inventor: Julio Cesar Gonzalez, Lubbock, TX (US)

( * ) Notice: Subject to any disclaimer, the term of this patent is extended or adjusted under 35 U.S.C. 154(b) by 110 days.

(21) Appl. No.: 16/735,642

(22) Filed: Jan. 6, 2020

(65) Prior Publication Data
US 2020/0215802 A1 Jul. 9, 2020

Related U.S. Application Data

(60) Provisional application No. 62/789,328, filed on Jan. 7, 2019.

(51) Int. Cl.
*B32B 7/12* (2006.01)
*B32B 27/10* (2006.01)
*D21H 27/10* (2006.01)

(52) U.S. Cl.
CPC ............... *B32B 27/10* (2013.01); *B32B 7/12* (2013.01); *D21H 27/10* (2013.01); *B32B 2307/726* (2013.01); *B32B 2307/73* (2013.01); *B32B 2439/70* (2013.01)

(58) Field of Classification Search
CPC combination set(s) only.
See application file for complete search history.

(56) References Cited

U.S. PATENT DOCUMENTS

| | | | |
|---|---|---|---|
| 6,610,381 B1 * | 8/2003 | Conway | A61F 13/5148 428/86 |
| 6,926,308 B2 * | 8/2005 | Penn | A47K 10/16 162/109 |
| 2010/0221562 A1 * | 9/2010 | Hawkins-Garcia | B32B 15/12 428/464 |
| 2012/0164427 A1 * | 6/2012 | Hudson | B32B 29/005 428/221 |

* cited by examiner

*Primary Examiner* — Elizabeth E Mulvaney
(74) *Attorney, Agent, or Firm* — Fraley Patent Law

(57) ABSTRACT

A single ply napkin food wrapper is moisture resistant on the food side but moisture absorbent on the outside. The wrapper is used to wrap food when delivered to the customer and the wrapper can later be used as a napkin by the customer. Delivery of a napkin is thus ensured with each food item.

20 Claims, 6 Drawing Sheets

COMBINATION FOOD WRAPPER AND NAPKIN

CROSS-REFERENCE TO RELATED APPLICATIONS

This application claims a benefit of priority under 35 U.S.C § 119 to Provisional Application No. 62/789,328 filed on Jan. 7, 2019, which is fully incorporated herein by reference in its entirety.

FIELD OF THE INVENTION

This disclosure relates generally to food packaging and more particularly to food wrappers used in the restaurant business and especially so-called fast food restaurants.

BACKGROUND

So-called fast food restaurants deliver sandwiches such as burgers to customers wrapped in a liquid-resistant coated paper such as wax paper. Such coated paper effectively keeps the exterior surface of the wrapping paper dry so that a customer's hands do not get wet from the contents, which may have wet condiments and other juices from the sandwich.

It is all too often the case, however, that napkins are not delivered to the customer along with the sandwich; or the napkins are inconveniently accessible in the delivery bag. This is especially true when a food order is delivered through a drive-thru window. This can be a problem, particularly when a customer eats the sandwich in the car while driving, because the customer's hands often get wet from contact with the food juices or condiments when unwrapping the sandwich. A napkin may not be available or be readily accessible. So, the customer ends up wiping their wet hands on the delivery bag, on the car upholstery, or on theft clothing. This is an unsatisfactory situation.

On the restaurant side, often an employee will supply a customer with many more napkins than needed, creating extra expense for the restaurant as well as excess trash. Therefore, a need exists for a better solution for delivering napkins to a restaurant customer.

SUMMARY OF THE INVENTION

A single ply napkin wrapper that can be used to wrap food item and then be used as a napkin is provided. The napkin wrapper is moisture resistant on the food side but moisture absorbent on the outside, thus holding juices and condiments inside the wrapper while maintaining a clean napkin on the outside for the customer to use.

The napkin wrapper may comprise a liquid-resistant sheet and an absorbent sheet attached by use of a binding sheet or adhesive placed between the liquid-resistant sheet and the absorbent sheet. Additional layers such as a foil sheet may be placed between the liquid-resistant sheet and the absorbent sheet to increase heat retention of the wrapper. Additional binding sheets or adhesives may be used to attach the sheets together. An ornamental design may be printed on any of the layers or stamped into any of the sheets.

To produce a napkin wrapper, a binding sheet is placed between a liquid-resistant sheet and an absorbent sheet. Pressure is applied to the sheets to hold them together. The binding sheet may be activated, such as by heat or UV light, to cause the sheets to bind together, creating a single ply napkin wrapper.

DETAILED DESCRIPTION

Restaurant customers are often served food with too few napkins or even none at all. This can be particularly troublesome for customers of drive-thru restaurants when they may be miles away from the restaurant when they need a napkin. To solve this problem, a napkin wrapper is provided herein that can be used both as a food wrapper and also as a napkin.

Figure 1:
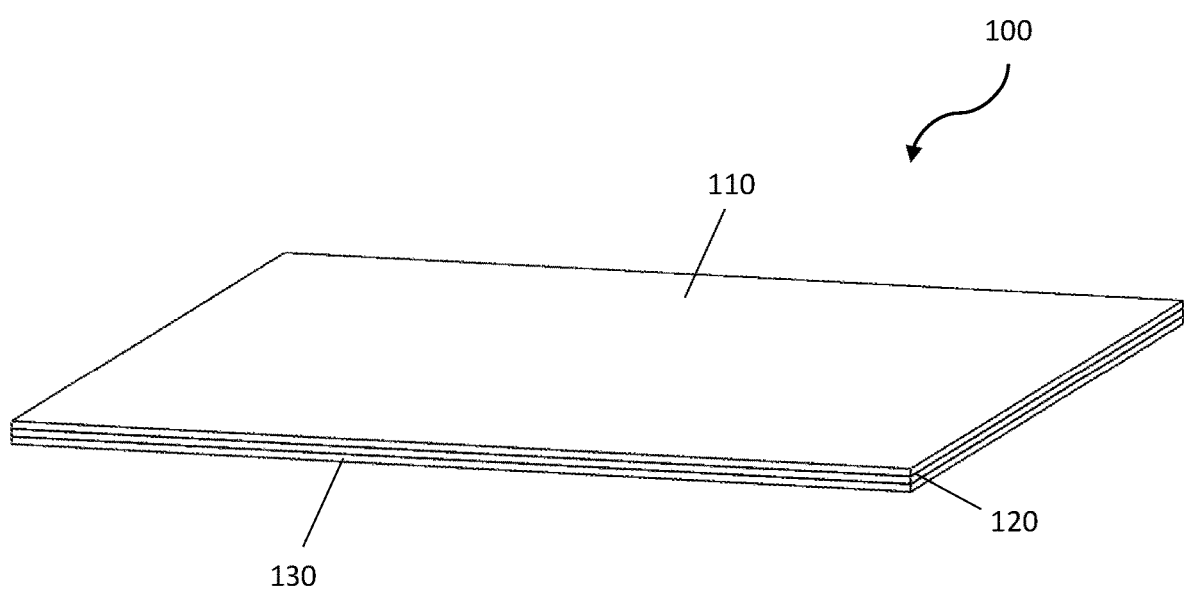
FIG. 1 depicts a napkin wrapper having a binding sheet according to one embodiment.

FIG. 1 depicts a napkin wrapper 100 according to one embodiment. The wrapper comprises three layers: a moisture retention layer 110, a binding layer 120, and a moisture absorbent layer 130. The moisture retention layer 110 prevents juices and other liquids from escaping the wrapper, keeping the moisture absorbent layer 130 clean for use as a napkin as well as reducing the messiness of the food. The moisture retention layer may be a sheet of treated paper, such as waxed paper or may be butcher paper or foil paper. The binding layer 120 sits between the moisture retention layer 110 and the moisture absorbent layer 130 and serves primarily to bind the layers together to create a single unit. The binding layer 120 may be film of regenerated cellulose such as cellophane or a plastic sheet. Heat or pressure may be used to activate binding layer 120 (e.g., by melting it), thus creating a single sheet. The waxed paper may be waxed on one side only, with the non-waxed side facing the binding layer. The moisture absorbent layer 130 serves as a napkin and can be any absorbent material such as napkin-grade paper or a sheet of paper towel. The resulting single ply sheet is waxed on one side, the interior side of the wrapper, to retain food fluids, and absorbent on the other side, the exterior side of the wrapper, to serve as a napkin.

Figure 2:
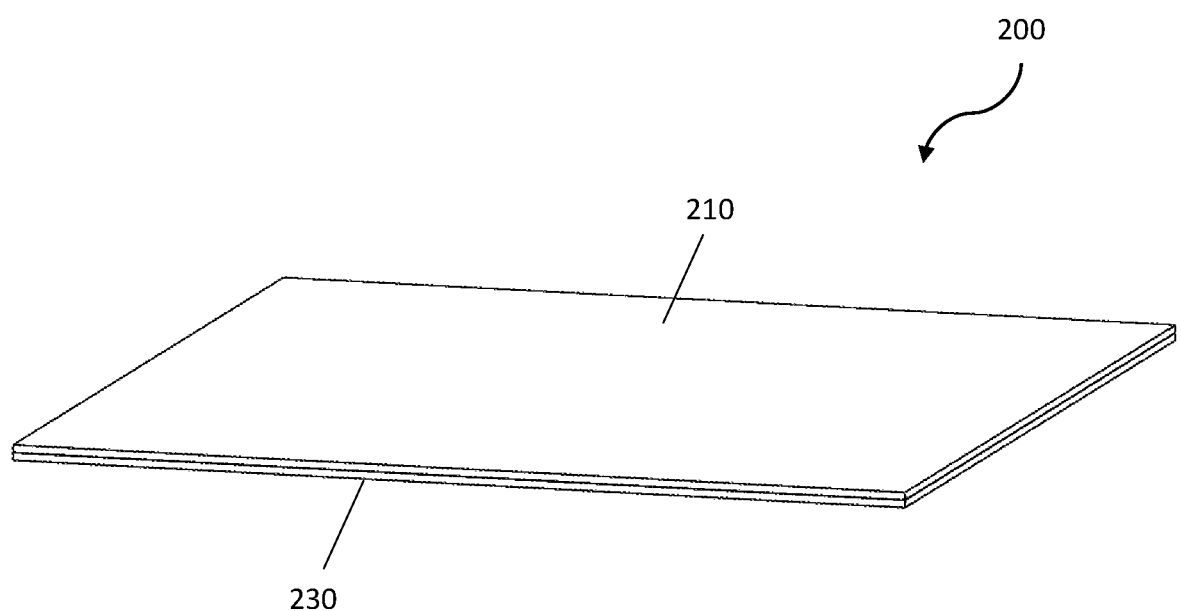
FIG. 2 depicts a napkin wrapper according to one embodiment.

Many variations of a napkin wrapper are contemplated. For example, in the embodiment shown in FIG. 2, a napkin wrapper 200 may be formed of two layers, a moisture retention layer 210, and a moisture absorbent layer 230. The two layers may be attached using an adhesive applied to one or both of the layers. The adhesive may be applied using known methods, including by brushing, rolling, or by spraying the adhesive onto the sheet. Application of pressure may be used to force the two layers together. The adhesive may be a food-grade adhesive and may cure by itself or by the application of pressure, heat, moisture, UV light, a curing agent, or the like.

Figure 3:
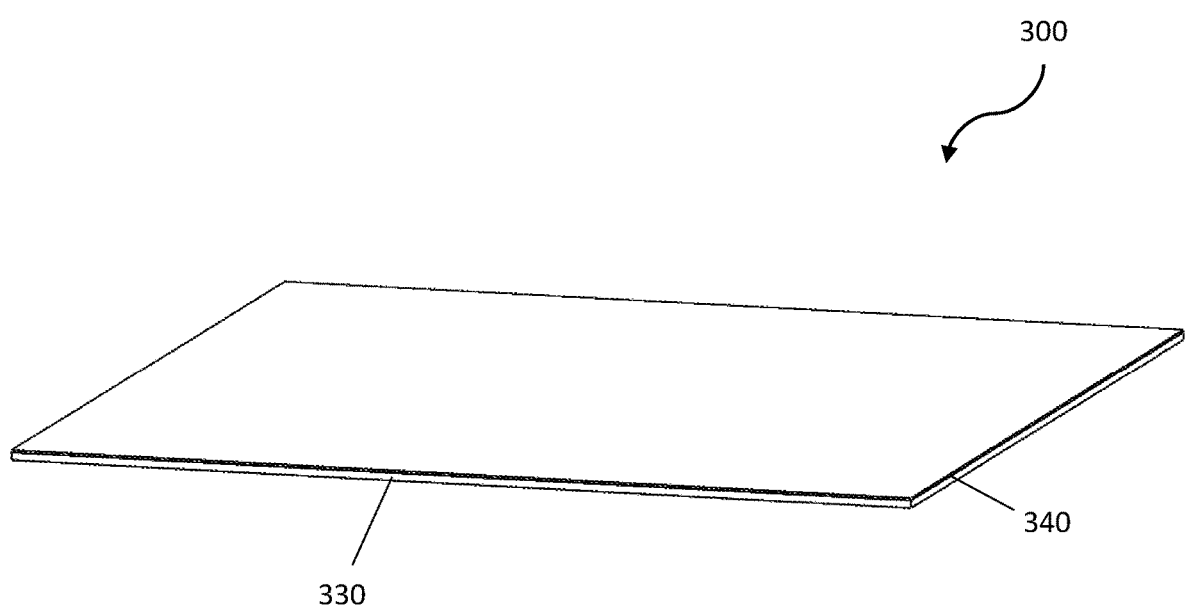
FIG. 3 depicts a napkin wrapper according to another embodiment.

FIG. 3 shows one embodiment of a napkin wrapper 300 which is comprised of a moisture absorbent layer 330 with a moisture-resistant coating 340 applied to one side. Rather than binding two or more sheets together, napkin wrapper 300 is formed by forming a moisture-resistant layer on the napkin itself. For example, a coating may be applied onto one side of the moisture absorbent layer. The moisture-resistant coating 340 prevents juices and liquids from escaping the wrapper and contaminating the napkin (moisture absorbent layer 330). The coating may be applied as a liquid and may be brushed, rolled, or sprayed onto one side of the moisture absorbent layer 330 and may comprise any suitable material, such as a polymer, wax/paraffin, or a wax/oil blend. The coating may also be applied as a solid material (e.g., cellophane sheet) which is bonded directly to the moisture absorbent layer 330 without the use of an adhesive or a binding layer. For example, the coating may be a cellophane sheet that is pressed against the moisture absorbent layer 330 while heat is applied, resulting in the cellophane sheet binding directly to the moisture absorbent layer to create a moisture-resistant coating.

Figure 4:
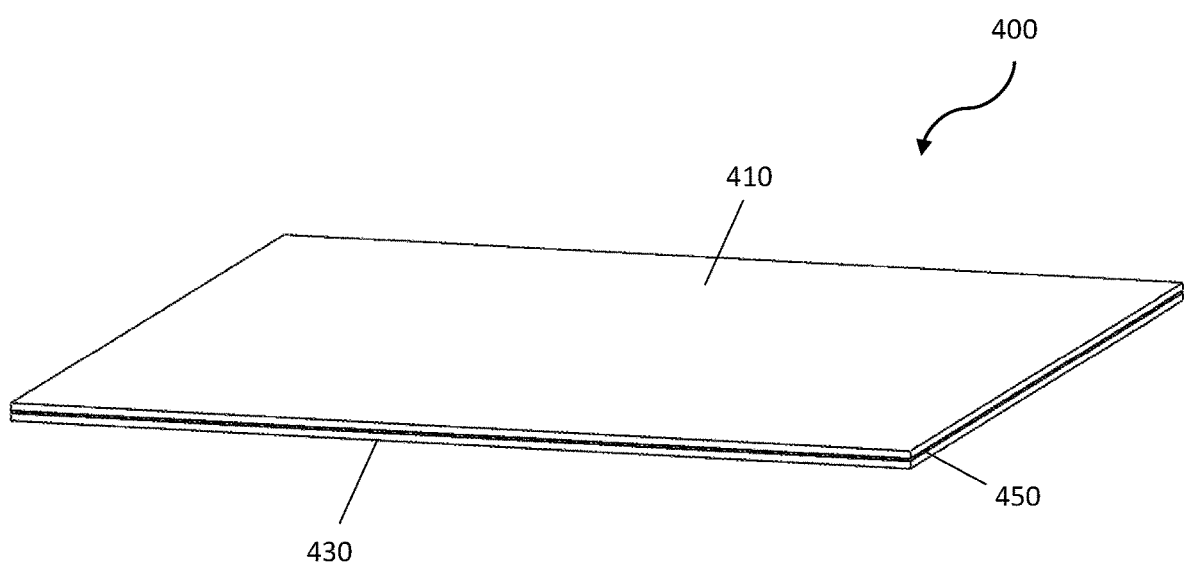
FIG. 4 depicts a napkin wrapper having a foil sheet according to one embodiment.

Still further variations are contemplated. For example, as shown in FIG. 4, a foil layer 450 may be placed between a moisture retention layer 410 and a moisture absorbent layer 430 to create napkin wrapper 400. Foil layer 450 may act to retain heat to keep the food warm longer. Adhesives or binding layers may be used between the layers to bind them together, creating a single sheet.

Designs or patterns may also be stamped into any or all layers of the wrapper. The moisture absorbent layer (napkin) may be printed with an ornamental design, such as the logo of the restaurant or an identifier of the food item the wrapper is designed for. An outer layer may be used to cover the napkin to keep it clean until the customer is ready to use the napkin. For example, a paper or plastic sheet may be attached to the napkin opposite the moisture retention layer and made easily removable by the customer when the napkin is desired. The outer layer may comprise a printed design such as a logo, pattern, or product identifier.

Figure 5:
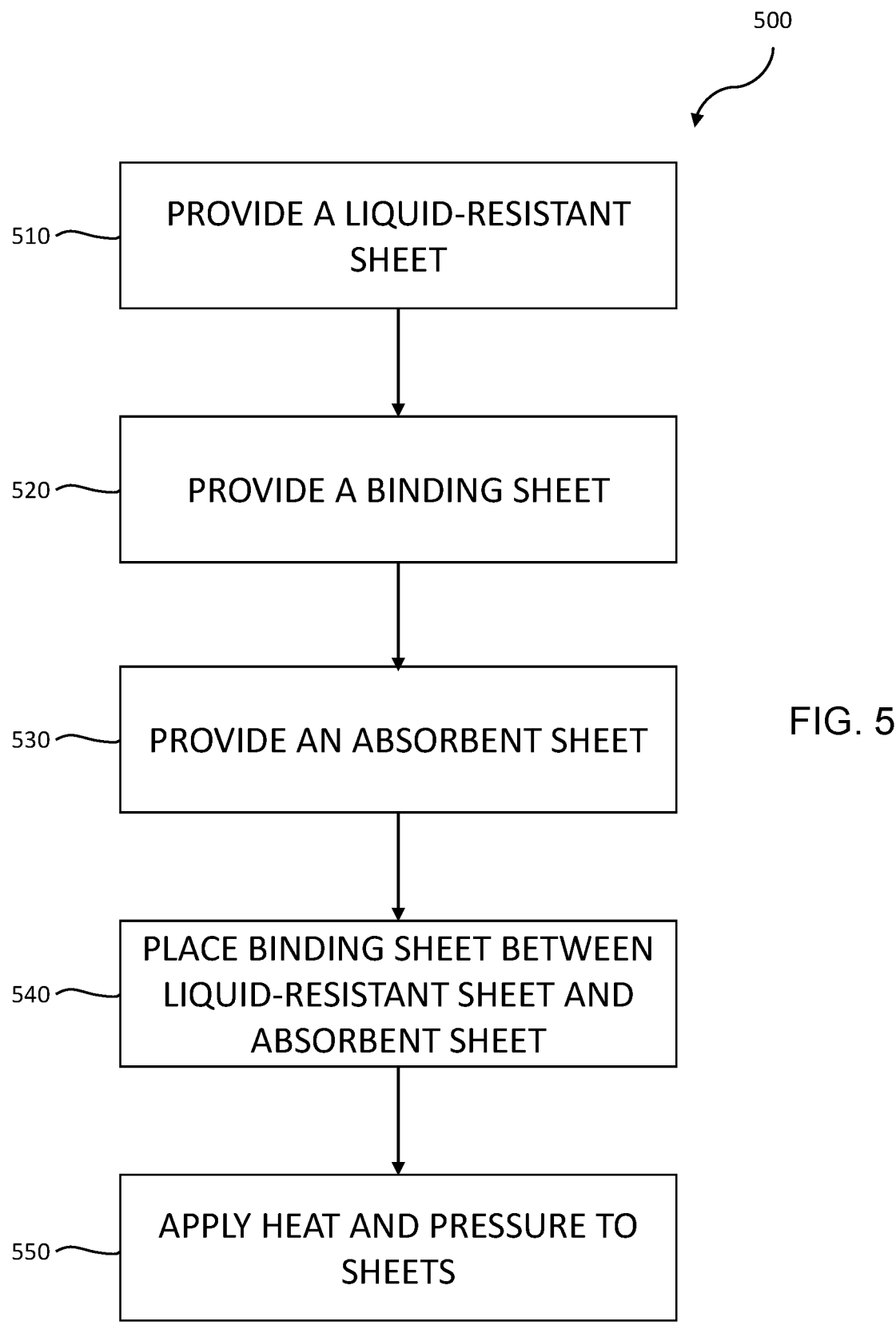
FIG. 5 depicts a method for making a napkin wrapper using a binding sheet.

A method 500 for making a napkin wrapper according to one embodiment is shown in FIG. 5. A liquid-resistant sheet 510, a binding sheet 520, and an absorbent sheet 530 are provided. The binding sheet is placed between the liquid resistant sheet and the absorbent sheet 540. Heat and pressure are applied to the sheets 550, causing the binding layer to adhere to the liquid resistant sheet and the absorbent sheet, creating a single ply napkin wrapper.

Figure 6:
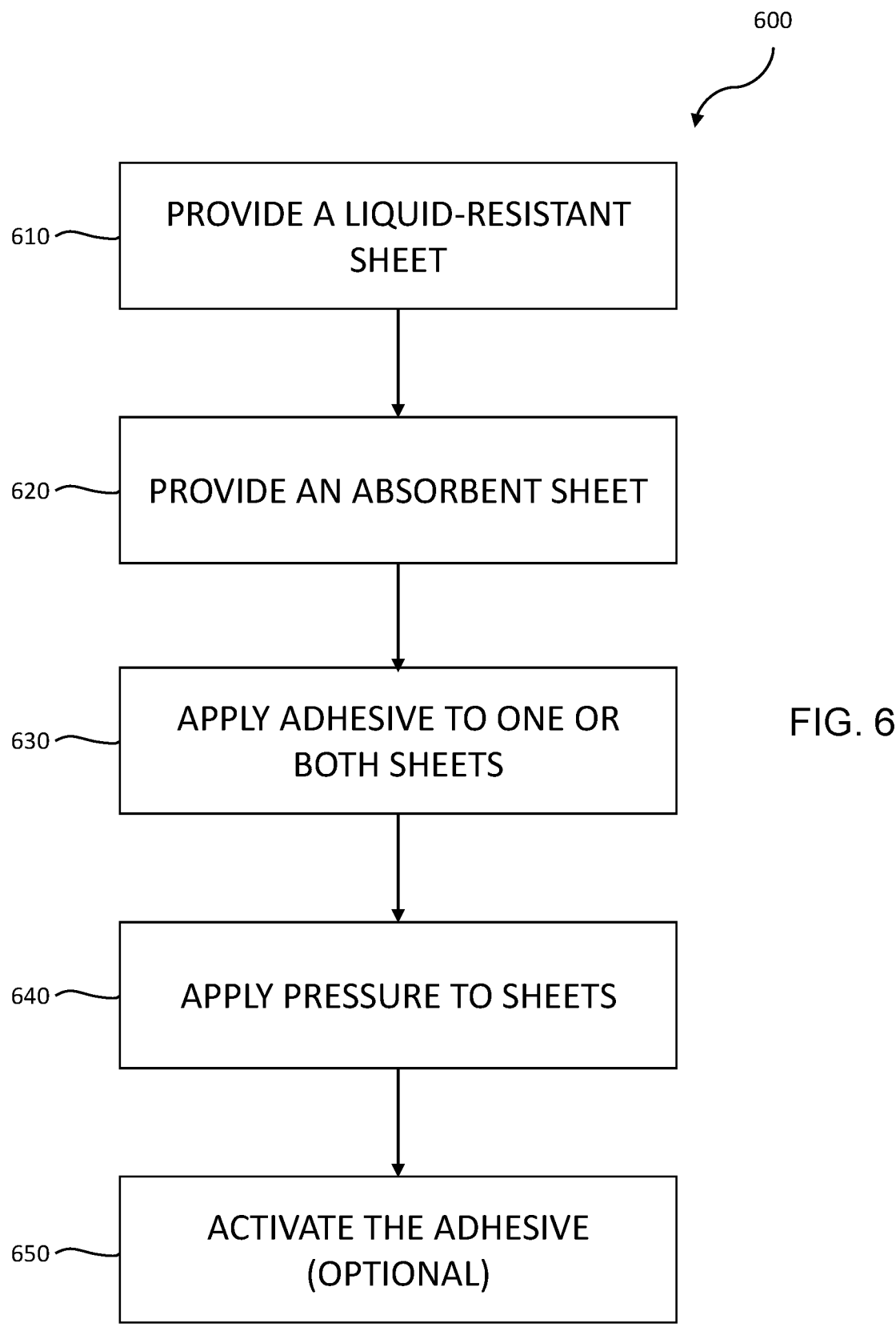
FIG. 6 depicts a method for making a napkin wrapper without using a binding sheet.

FIG. 6 shows an alternative method 600 for creating a napkin wrapper according to one embodiment. A liquid resistant sheet 610 and an absorbent sheet 620 is provided. An adhesive is applied to one or both of the sheets 630. Pressure is applied to the sheets 640 to hold them together. Optionally, the adhesive may be activated 650 such as by applying heat or UV light.

The discussion herein of the present invention is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In the following discussion and in the claims, the terms "including," "consisting of", and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

Many modifications and other embodiments of the napkin wrapper described herein will come to mind to one skilled in the art to which this disclosure pertains having the benefit of the teachings presented in the foregoing descriptions and the associated drawings. For example, it will be understood that the invention is not limited to materials discussed herein as examples, such as wax paper, plastic, polyethylene, paper, and the like and that the invention contemplates that more advantageous materials may be used particularly to scale up production to a commercial scale.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A combination food wrapper and napkin, comprising:
   a liquid-resistant sheet for containing food and liquids from the food within the wrapper;
   an absorbent sheet for use as a napkin; and
   a binding sheet comprising cellophane or a plastic sheet between the liquid-resistant sheet and the absorbent sheet, the binding sheet attaching the liquid-resistant sheet to the absorbent sheet by the application of heat and pressure to melt the binding sheet,
   wherein when food is wrapped in the food wrapper the liquid-resistant sheet contains the food and prevents liquids from the food from reaching the absorbent sheet.

2. The food wrapper of claim 1, further comprising:
   an outer layer removably attached to the absorbent sheet to prevent soiling of the absorbent sheet.

3. The food wrapper of claim 2, wherein the outer layer comprises paper or plastic.

4. The food wrapper of claim 3, wherein the outer layer comprises a printed design.

5. The food wrapper of claim 1, wherein the liquid-resistant sheet is a coated paper.

6. The food wrapper of claim 1, wherein the liquid-resistant sheet is wax paper.

7. The food wrapper of claim 1, wherein the liquid-resistant sheet is waxed on one side only.

8. The food wrapper of claim 1, further comprising:
   a foil sheet between the liquid-resistant sheet and the absorbent sheet, the foil sheet attached to adjacent sheets such that the foil sheet and the binding sheet are between the liquid-resistant sheet and the absorbent sheet and each sheet is attached to adjacent sheets such that the liquid-resistant sheet is attached to the absorbent sheet.

9. The food wrapper of claim 1, wherein the absorbent sheet comprises a printed design.

10. A method of making a combination food wrapper and napkin, comprising:
    providing a liquid-resistant sheet for containing food and liquids from the food within the wrapper;
    providing an absorbent sheet for use as a napkin;

inserting a binding sheet comprising cellophane or a plastic sheet between the liquid-resistant sheet and the absorbent sheet;

attaching the liquid-resistant sheet to the absorbent sheet by applying heat and pressure to melt the cellophane or plastic sheet and bind the liquid-resistant sheet to the absorbent sheet.

11. The method of claim 10, further comprising:
attaching an outer layer to the absorbent sheet to prevent soiling of the absorbent sheet.

12. The method of claim 11,
wherein the outer layer comprises paper or plastic.

13. The method of claim 12,
wherein the outer layer comprises a printed design.

14. The method of claim 13, wherein the liquid-resistant sheet is a coated paper.

15. The method of claim 13, wherein the liquid-resistant sheet is wax paper.

16. The method of claim 10, wherein the liquid-resistant sheet is waxed on one side only.

17. The method of claim 10, wherein the liquid-resistant sheet is a coated paper.

18. The method of claim 10, wherein the liquid-resistant sheet is waxed on one side only.

19. The method of claim 10, further comprising:
providing a foil sheet;
placing the foil sheet between the liquid-resistant sheet and the absorbent sheet and
attaching the foil sheet to adjacent sheets such that the foil sheet and the binding sheet are between the liquid-resistant sheet and the absorbent sheet and each sheet is attached to adjacent sheets such that the liquid-resistant sheet is attached to the absorbent sheet.

20. The method of claim 10, wherein the absorbent sheet comprises a printed pattern.

* * * * *